United States Patent [19]

Toyama et al.

[11] Patent Number: 5,136,629
[45] Date of Patent: Aug. 4, 1992

[54] RADIO COMMUNICATION SYSTEM HAVING CONTROL METHOD FOR SHORTENING CALL RESPONSE TIME

[75] Inventors: Hideki Toyama, Yokohama; Yuji Ohta, Suite; Noboru Saegusa; Yukihiro Shimura, both of Tokyo; Shoji Fuse; Koji Ono, both of Hachiaji, all of Japan

[73] Assignees: Nippon Telegraph and Telephone Corporation; NEC Corporation, both of Tokyo; Kabushiki Kaisha Toshiba, Kanagawa, all of Japan

[21] Appl. No.: 442,364

[22] PCT Filed: Feb. 15, 1989

[86] PCT No.: PCT/JP89/00153
  § 371 Date: Dec. 12, 1989
  § 102(e) Date: Dec. 12, 1989

[87] PCT Pub. No.: WO89/07867
  PCT Pub. Date: Aug. 24, 1989

[30] Foreign Application Priority Data
  Feb. 16, 1988 [JP] Japan .................................. 63-33395

[51] Int. Cl.[5] .......................................... H04M 11/00
[52] U.S. Cl. .......................................... 379/58; 379/61
[58] Field of Search .......................... 379/58, 61-63

[56] References Cited

U.S. PATENT DOCUMENTS

5,014,295  5/1991  Kunihiro .............................. 379/63

FOREIGN PATENT DOCUMENTS

| 0214809 | 3/1987 | European Pat. Off. | 379/63 |
| 0048137 | 3/1987 | Japan | 379/58 |
| 0077728 | 4/1987 | Japan | 379/58 |
| 0108626 | 5/1987 | Japan | 379/58 |

*Primary Examiner*—James L. Dwyer
*Assistant Examiner*—Dwayne D. Bost
*Attorney, Agent, or Firm*—Finnegan, Henderson, Farabow, Garrett and Dunner

[57] ABSTRACT

A radio communication system of a multi-channel access type in which an idle one of a plurality of radio channels is detected to perform transmission and reception of voice signals, data signals or the like. In the present system, in the case where a base unit receives an incoming call from a wired line, the base unit transmits to a plurality of radio terminal units a speech channel designation signal as well as a representative radio terminal designation signal specifying a representative radio terminal unit from the plurality of radio terminal units, and when receiving a channel switching completion signal from the representative radio terminal unit, the base unit transmits a signal for generation of ringing tones to the plurality of radio terminal units at the same time to cause the plurality of radio terminal units to generate the ringing tones at the same time.

10 Claims, 4 Drawing Sheets

RADIO COMMUNICATION SYSTEM HAVING CONTROL METHOD FOR SHORTENING CALL RESPONSE TIME

BACKGROUND OF THE INVENTION

1. Technical Field

The present invention relates to a radio communication system of a multi-channel access type in which an idle one of a plurality of radio channels is detected to perform transmission and reception of voice signals, data signals or the like, and also a method of controlling the radio communication system.

2. Background Art

FIG. 3 is a block diagram showing an arrangement of a prior art radio communication system of the type referred to above. In the drawing, a base unit 1 is to be coupled, at its one side, through a radio communication circuit to a radio telephone set 2 as a radio terminal apparatus; while the base unit is also connected, at the other side, to a wired telephone line 3.

A signal sent from the wired telephone line 3 is supplied through a line relay 10 and a hybrid circuit 11 to a transmitter 12 as its modulation input. Electromagnetic waves subjected to a modulation at the transmitter 12 are transmitted from an antenna 14 to the radio telephone set 2 through antenna duplexer 13.

Electromagnetic waves transmitted from the radio telephone set 2, on the other hand, are received at the antenna 14 and sent through the antenna duplexer 13 to a receiver 15 to be demodulated thereat. A signal subjected to demodulation at the receiver 15 is send through the hybrid circuit 11 onto the wired telephone circuit 3.

A synthesizer 16 applies to the transmitter 12 and the receiver 15 a signal of a frequency corresponding to radio channels, that is, speech and control channels.

The receiver 15 has a function of demodulatiing a data signal included in the received demodulation wave signal, that is, demodulating an identification signal determined by a combination of the base unit 1 and the radio telephone set 2, and the receiver 15 applies the demodulated identification signal (ID code) to a controller 17. The controller 17 per se is used to control the synthesizer 16 in such a manner that the switching of the radio channels is controlled and a transmission data signal is applied to the transmitter 12 as its modulation input. A ringing-signal detecting circuit 18 detects a ringing signal of 16 Hz received from the wired telephone line 3. The identification signal of the radio telephone set 2 is previously stored in a ROM 19.

As in the base unit 1, the radio telephone set 2 also has an antenna 20, a receiver 21, an antenna duplexer 22, a transmitter 23 and a synthesizer 24, a demodulated output of the receiver 21 being output to a speaker 30. A voice input through a microphone 25 is applied to the transmitter 23 as its modulation input, sent to the antenna duplexer 22 and further transmitted from the antenna 20.

The synthesizer 24 and a ROM 26 are substantially the same as those in the base unit 1. A controller 27 performs the entire control over the radio telephone set 2. A loudspeaker 28 is a sounder which generates a ringing tone at the time of receiving an incoming signal.

The control of this prior art in its incoming signal mode is schematically carried out in accordance with such a flowchart as shown in FIG. 4. The base unit 1, when detecting at the ringing-signal detecting circuit 18 an incoming signal received from the wired telephone line 3 in its wait mode (step 30), sets the oscillation frequency of the synthesizer 16 at a control channel frequency, turns ON the receiver 15 to receive electromagnetic waves on a control channel (C-CH), and in the absence of the received electromagnetic waves, judges that the control channel is idle and transmits the incoming signal from the transmitter 12 (steps 31 and 32). In this case, the incoming signal contains a speech channel (S-CH) designation signal.

In the radio telephone set 2 during the wait mode, on the other hand, the synthesizer 24 is turned ON, the oscillation frequency of the synthesizer is set at the control channel frequency, and the receiver 21 is intermittently turned ON. When the receiver 21 is turned ON (step 50), the transmitter 23 is turned ON under a condition that the ID code contained in the incoming signal coincides with the ID code stored in the ROM 26, so that the transmitter transmits an incoming-signal answering signal including its own ID code (step 51) and the speech channel (S-CH) is switched to the specified one (step 52). In the case where the radio telephone set 2 receives no incoming signal, the receiver 21 is turned OFF and the radio telephone set is put back in its wait mode.

The base unit 1 is monitoring the arrival of the incoming-signal answering signal from the radio telephone set 2 for a time of T1. If the base unit 1 receives the incoming-signal answering signal within the time of T1 (steps 33 and 34), then the base unit stops the transmission of the incoming signal therefrom, compares the ID code contained in the incoming-signal answering signal with the ID code stored in the ROM 19, and when finding an ID code coincidence, switches the speech channel (S-CH) to the one specified by the incoming signal (step 35). If the base unit fails to find an ID code coincidence, then the unit awaits the disappearance of the ringing signal from the wired telephone line 3 and returns to the wait mode, since this incoming-signal answering signal is from another undesired radio telephone. Even when the base unit 1 fails to receive the incoming-signal signal within the time T1, the unit returns to the wait mode.

The radio telephone set 2, on the other hand, switches the current speech channel to the one specified by the base unit 1. When the switched speech channel is already being used, the radio telephone set 2 returns to the wait mode (step 53). When the switched speech channel is not being used, the radio telephone set 2 transmits a channel switching completion signal toward the base unit 1 (step 55).

Meanwhile, the base unit 1 is monitoring the arrival of the channel switching completion signal from the radio telephone set 2 for a time of T2. When the base unit 1 fails to monitor the arrival of the channel switching completion signal within the time of T2, the base unit regards the radio telephone set 2 as having judged that the speech channel is in use, and returns to the wait mode. When the base unit 1 detects the arrival of the channel switching completion signal within the time T2 (steps 36 and 37), the base unit transmits a bell ringing signal (step 38). The radio telephone set 2, when receiving the bell ringing signal (step 56), causes the loudspeaker 28 to generate a ringing tone (step 57). Responsive to the ringing tone, if the telephone user turns OFF a hook switch 29 to provide an off-hook operation to the radio telephone set 2 (step 58), then this causes the radio telephone set 2 to transmit an off-hook signal (step 59) and then to be put in its speech mode (step 60).

The base unit 1, when receiving the off-hook signal (step 39), stops the transmission of the bell ringing signal, closes the line relay 10 to establish a speech loop with the wired telephone line 3, and thus enters into its speech mode (step 40).

The following is the operation of the radio communication system when it is desired to give a call from the radio telephone set 2. That is, when the telephone user turns OFF the hook switch 29 for the purpose of giving a call to the wired telephone line 3, this causes the controller 27 to judge on the basis of the switch 29 turned OFF that the radio telephone set should be moved to its signal transmission mode, lock the oscillation frequency of the synthesizer 24 at that of the control channel, and turn ON the receiver 21 to receive electromagnetic waves on the control channel (C-CH). And when the intensity of electric field received on the control channel is lower than a predetermined constant value, the controller judges that the control channel is idle and turns ON the transmitter 23 to transmit therefrom a calling signal including the ID code assigned to its own telephone set. The base unit 1, when receiving the ID code, decides whether or not the received ID code coincides with the ID code assigned to the combination between the radio telephone set 2 and the base unit 1. If the base unit 1 finds an ID code coincidence, then it turns ON the transmitter 12 to transmit an answering signal (including the ID code and speech channel (S-CH) designation information) therefrom toward the radio telephone set 2.

The radio telephone set 2 receives the answering signal from the base unit 1 on the control channel, and determines whether or not the ID code included in the received answering signal coincides with its own one. If the radio telephone set determines to be an ID code coincidence, then it causes the oscillation frequency of the synthesizer 24 to be switched to the frequency of the speech channel specified by the base unit 1. Meanwhile, the base unit 1 itself, after having transmitted the answering signal, causes the oscillation frequency of the synthesizer 16 to be switched to the frequency of the speech channel specified for the speech. As a result, the radio telephone set 2 is interconnected with the base unit 1 through the speech channel specified by the base unit 1. Thereafter, user's dialing operation with use of a dial key (not shown) enables the calling of the telephone party and the realization of speech with that party.

In the aforementioned radio communication system, such an arrangement is considered that n (n≧2) of the radio telephone sets are provided for a single base unit so that, when the base unit receives an incoming call from the wired telephone line, not only one radio telephone set but all the radio telephone sets generate ringing tones to improve the possibility of answering the incoming call. In this case, the incoming signal including a speech-channel designation signal is transmitted to all the radio telephone sets to generate the ringing tones at all the radio telephone sets.

As will be clear from a flowchart shown in FIG. 4, each of the radio telephone sets switches the current speech channel to the one specified by the base unit, checks the idle or non-idle state of the speech channel, and when finding the idle state, transmits the channel switching completion signal. Such operation proceeds simultaneously with respect to all the n radio telephone sets. For this reason, the channel switching completion signals will be transmitted substantially at the same time from all the radio telephone sets, which may cause radio interference at the base unit. To avoid such radio interference, such an arrangement is necessary that the channel switching completion signals be transmitted from the respective radio telephone sets in slightly mutually shifted timing relationship therebetween, and only when the base unit receives all the channel switching completion signals from all the radio telephone sets, the base unit should transmit the bell ringing signal.

In the case where the channel switching completion signals are transmitted to the base unit at different timings, however, the base unit must wait to transmit the bell ringing signal until the base unit receives all the channel switching completion signals from the n radio telephone sets. For this reason, the prior art radio communication system has such a problem that the generation of the ringing tones at the respective radio telephone sets is delayed and thus user's response is also delayed.

It is an object of the present invention to provide a radio communication system which, when it is desired to generate ringing tones at the same time at a plurality of radio telephone sets as radio terminal units, can generate such ringing tones in a short time, and also to provide a method of controlling the radio communication system.

SUMMARY OF THE INVENTION

In accordance with the present invention, the above object is attained by providing, in a base unit, control means for, when the base unit receives an incoming call from a wired line, transmitting to a plurality of radio terminal units a speech channel designation signal as well as a signal specifying a representative radio terminal unit from the plurality of radio terminal units which responds to the incoming signal and returns a channel switching completion signal indicative of the completion of switching to the specified speech channel and also for, when receiving the channel switching completion signal from the representative radio terminal unit, transmitting a signal for generation of ringing tones at the same time to the plurality of radio terminal units.

Therefore, when the base unit receives the incoming call from the wired line, only a representative radio terminal unit from the plurality of radio terminal units which is specified by the base unit can send the speech channel switching completion signal to the base unit. And when the base unit receives the channel switching completion signal from the representative radio terminal unit, it transmits a bell ringing signal for generation of the ringing tones such that the ringing tones can be generated at the same time from the plurality of radio terminal units.

Thus, it can be eliminated that the base unit should await the transmission of the bell ringing signal until the base unit receives all the channel switching completion signals from the plurality of radio terminal units. As a result, the ringing tones can be generated at the same time from the plurality of radio terminal units and in a short time.

DETAILED DESCRIPTION OF THE PREFERRED EMBODIMENTS

Figure 1:
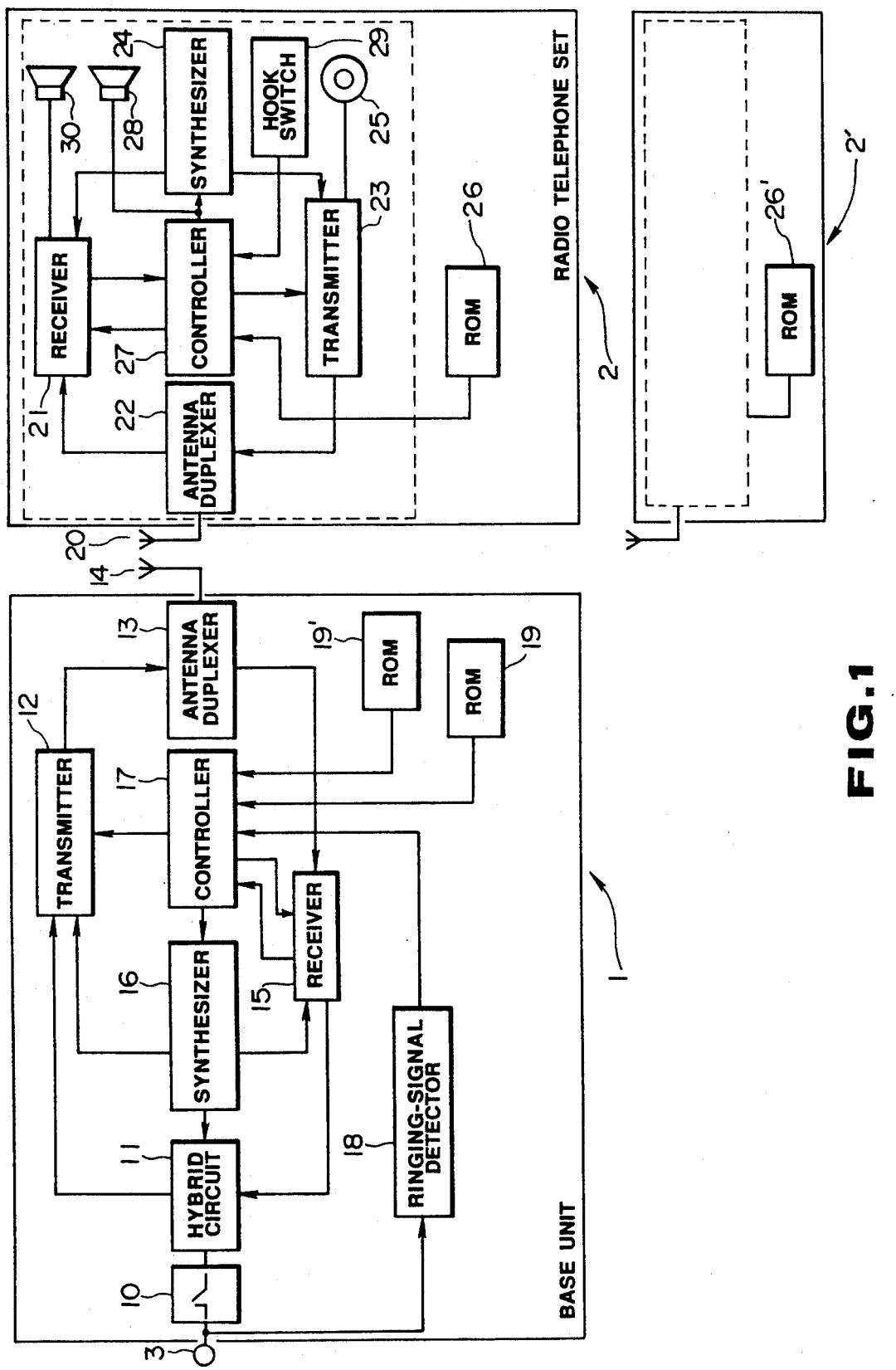
FIG. 1 is a block diagram showing an embodiment of the present invention.

Referring to FIG. 1, there is shown a block diagram of an embodiment of the present invention, in which two radio telephone sets 2 and 2' as radio terminal units are provided for a single base unit 1. Parts enclosed by broken lines in the two radio telephone sets 2 and 2' have an identical arrangement, but ROMs for storage of ID code provided in the telephone sets are distinguishably shown as denoted by 26 and 26', because the ROMs store respectively different ID codes assigned to the respective radio telephone sets 2 and 2'.

ROMs in the base unit 1 are correspondingly shown distinguishably as denoted by 19 and 19'.

Figure 2:
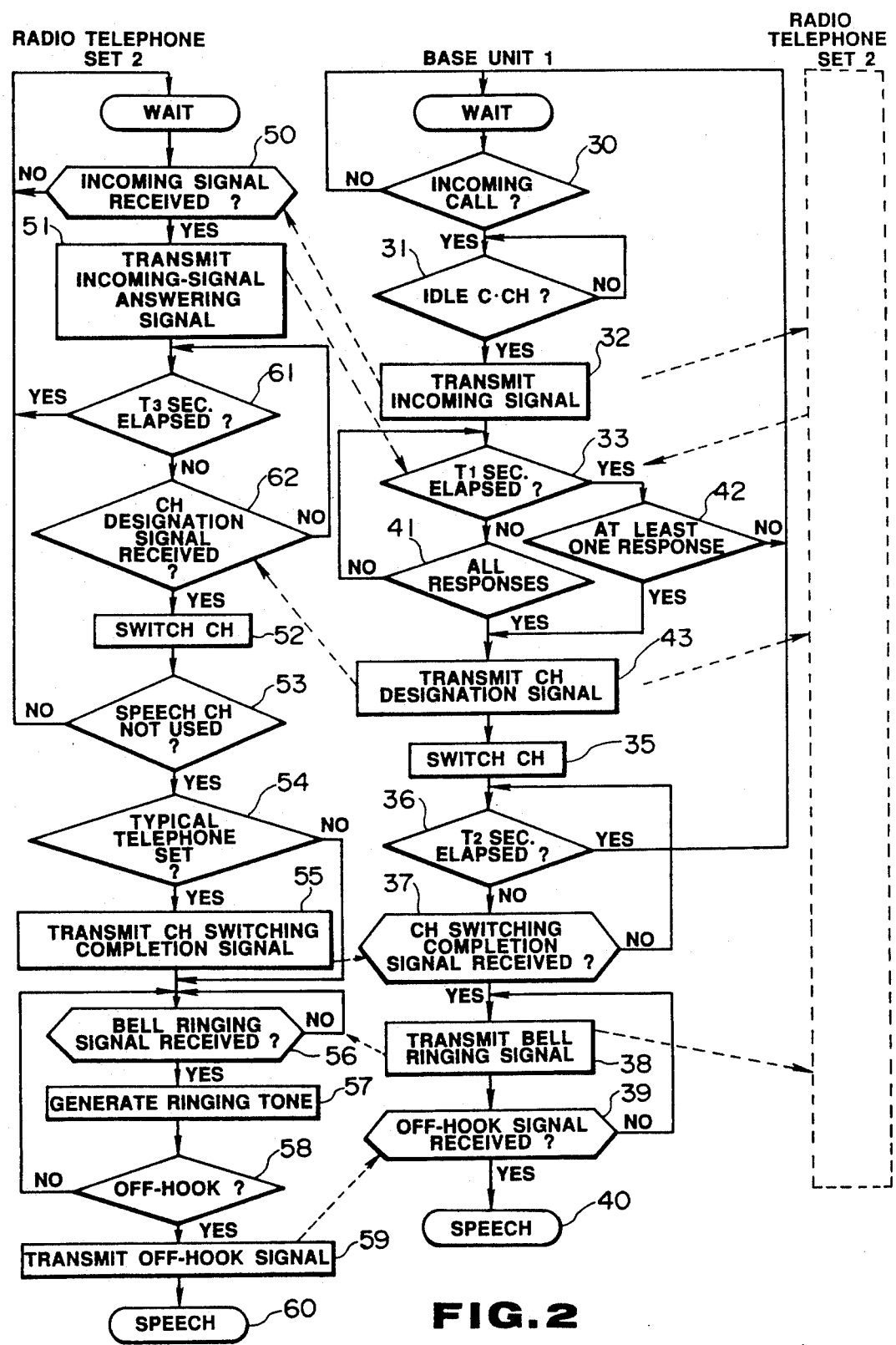
FIG. 2 is a flowchart showing the incoming-call operation of the embodiment.
Figure 3:
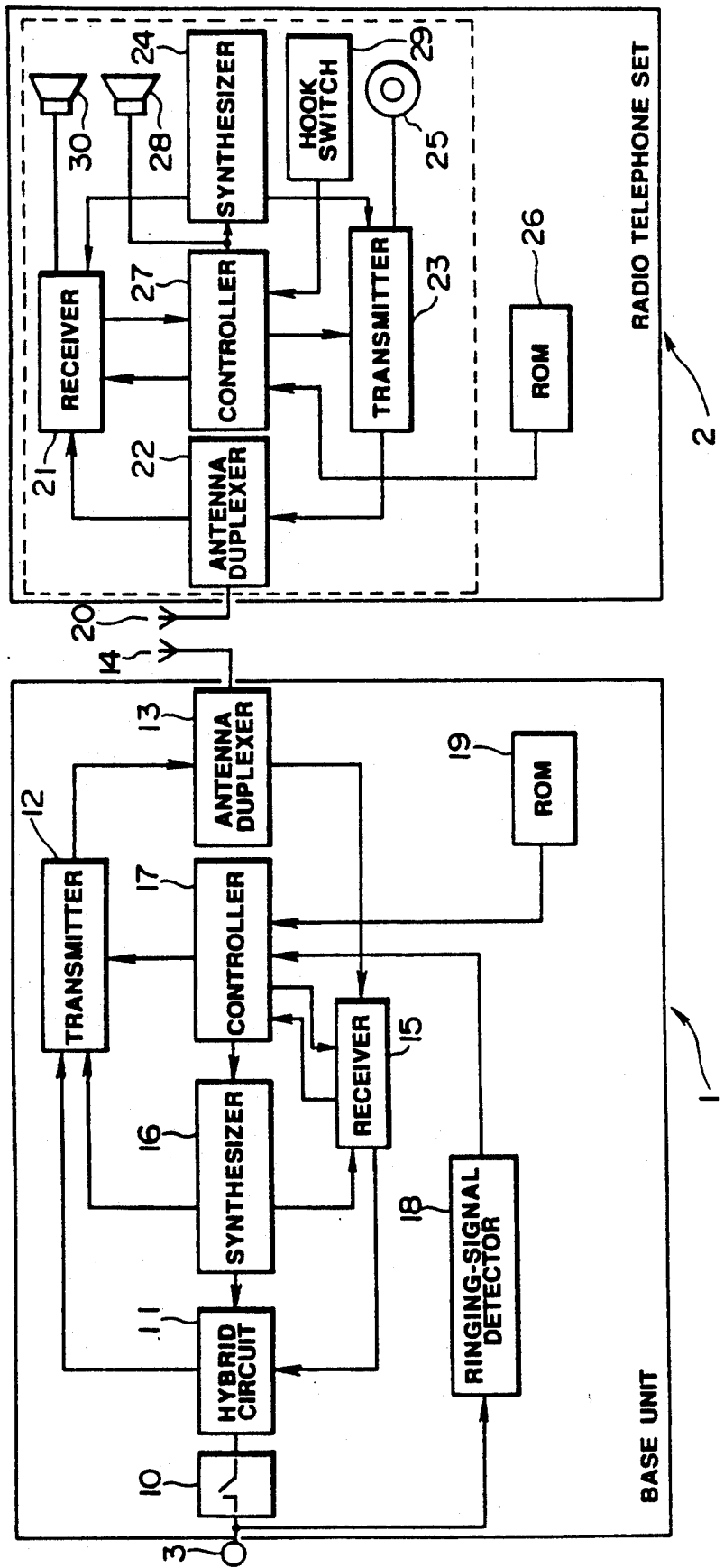
FIG. 3 is a block diagram showing an arrangement of a prior art radio communication system.
Figure 4:
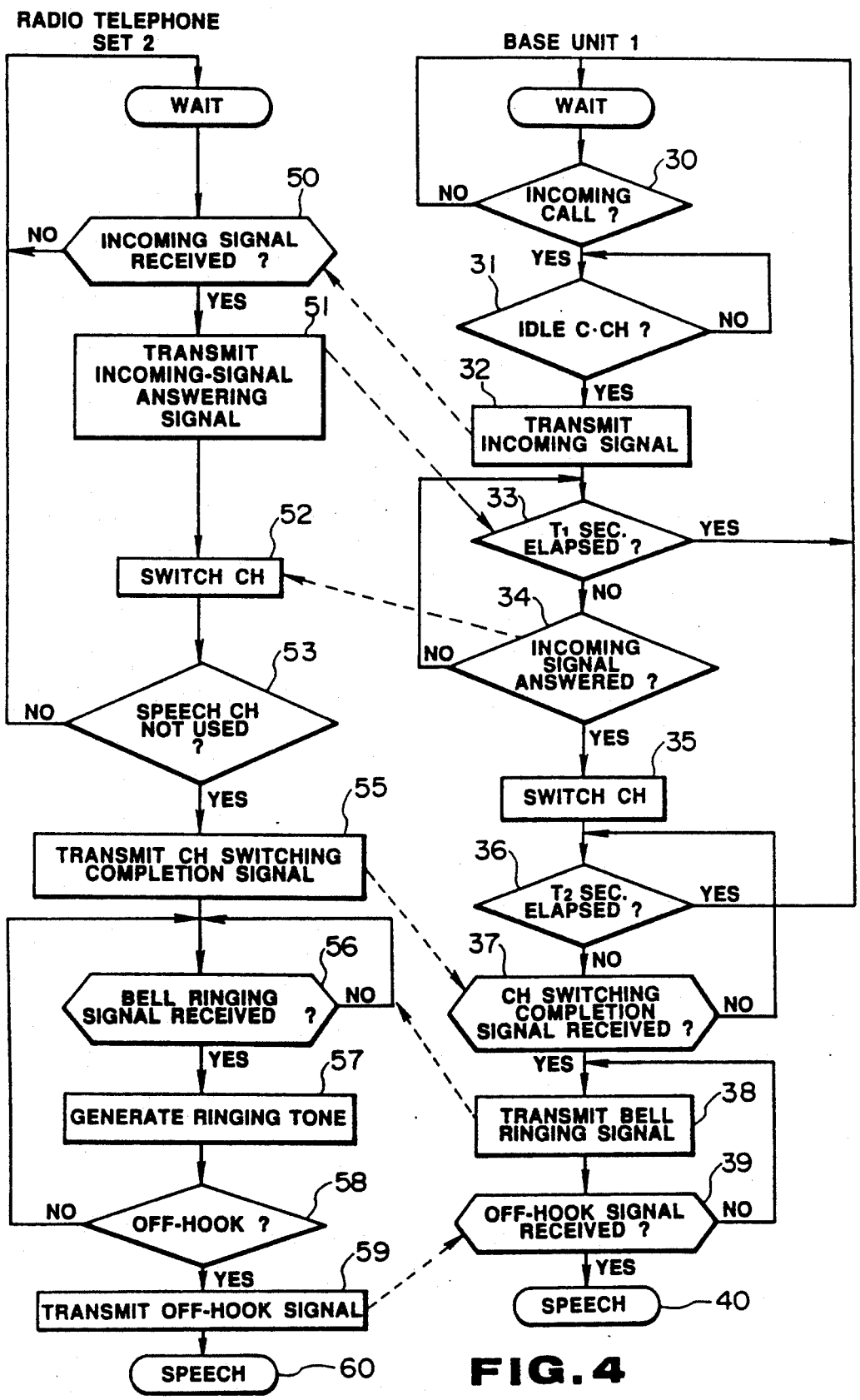
FIG. 4 is a flowchart showing the incoming-call operation of the prior art system.

The incoming call operation of this embodiment is shown by a flowchart in FIG. 2.

Explanation will be made as to the operation of the embodiment when receiving an incoming call from a wired telephone line 3, by referring to the flowchart of FIG. 2.

First, the base unit 1, when receiving an incoming call from a wired telephone line 3, checks the idle or non-idle state of the control channel and in the case of non-idle state, transmits an incoming signal, as in the prior art system. In this connection, in the conventional technique, the incoming signal contains both the speech-channel designation signal and the ID code of the radio telephone set. However, in the present embodiment, the incoming signal which is transmitted contains only the ID code and the return timing of an incoming-signal answering signal to be returned from the radio telephone sets 2 and 2' is prescribed by this ID code. The radio telephone set 2 or 2', when receiving the incoming signal containing the ID code that coincides with the ID code assigned to the telephone set (step 50), returns the incoming-signal answering signal containing its own ID code to the base unit 1 at a timing prescribed by the ID code (step 51). The base unit 1 is monitoring the arrival of the incoming-signal answering signal from the telephone sets for the time T1 after having transmitted the incoming signal. The base unit 1, when receiving the incoming-signal answering signals from both of the radio telephone sets 2 and 2' within the time T1, or when receiving the incoming-signal answering signal from at least one of the radio telephone sets 2 and 2' within the time T1 and the time T1 has elapsed (Steps 41 and 42), transmits a speech channel designation signal to the radio telephone sets and then switches its own speech channel to the one specified by the speech channel designation signal (steps 43 and 35).

Here, the channel designation signal contains a channel code indicative of the specified speech channel as well as an ID code signal specifying representative radio terminal unit from the plurality of radio terminal units which responds to the incoming signal and returns a channel switching completion signal to the base unit.

The radio telephone set 2 or 2' is monitoring the arrival of the channel designation signal for a time of T3 (steps 61 and 62). If the radio telephone set receives the channel designation signal, then it switches the current speech channel to the specified one (step 52) and checks the idle or non-idle state of the specified speech channel (step 53). When the specified channel is not in the idle state, the radio telephone set returns to its wait mode; whereas, when the specified channel is in the idle state, the telephone set examines whether the telephone set itself is selected to be the representative one. If the radio telephone set is selected to be the representative one (step 54), then only the representative radio telephone set transmits the channel switching completion signal (step 55). If the radio telephone set is not selected to be the representative one, then it awaits the reception of a bell ringing signal.

The base unit 1, when receiving the channel switching completion signal from the radio telephone set 1 as the typical one (steps 36 and 37), transmits the bell ringing signal (step 38) to the radio telephone sets 2 and 2' to cause the two radio telephone sets 2 and 2' to generate ringing tones at the same time.

As criterions on the basis of which the base unit 1 selects representative radio terminal unit from the radio telephone sets, the following conditions can be considered.

(1) One of the radio telephone sets specified by the ID code contained in the incoming-signal answering signal received first at the base unit.

(2) One of the radio telephone sets having the maximum or minimum value of the ID code contained in the incoming-signal answering signal received at the base unit.

(3) One of the radio telephone sets having the maximum intensity of electric field of the incoming-signal answering signal received at the base unit.

When the other 2' of the two radio telephone sets 2 and 2' which has not been selected to be representative one fails to receive the incoming signal for some reasons, for example, due to the fact that the radio telephone set 2' is located out of its wave arrival range, the telephone set 2' returns to its wait mode and thus will not generate a ringing tone.

Although explanation has been made as to the radio telephone sets, as an example, in the foregoing embodiment, the present invention may be applied to various sorts of radio terminal units for data transmission and so on.

As has been explained in the foregoing, in the present invention, when it is desired to generate ringing tones at a plurality of radio terminal apparatuses at the same time, representative radio terminal unit from the plurality of radio terminal units is selected and a base unit, only when receiving a channel switching completion signal from the representative radio terminal unit, transmits a signal for generation of the ringing tones. As a result, it can be eliminated that the base unit must await the reception of the channel switching signals from all the radio terminal units, and all the radio terminal units which have responded to the incoming signal can generate the ringing tones at the same time and in a short time.

We claim:

1. A radio communication system, comprising:
   a base unit connected to a wired line;
   a plurality of radio terminal units to be coupled through a radio circuit with said base unit;
   incoming-signal transmitting means, included in said base unit, for transmitting an incoming signal to said plurality of radio terminal units when said base unit receives an incoming call from said wired line;
   incoming-signal answering signal transmitting means, included in each of said radio terminal units, for transmitting incoming-signal answering signals containing an ID code of a corresponding radio terminal unit to said base unit at mutually shifted times in response to a reception of said incoming signal;

representative radio terminal selecting means, included in said base unit, for selecting a representative radio terminal unit from said plurality of radio terminal units;

channel-designation-signal transmitting means, included in said base unit, for transmitting a channel designation signal specifying a predetermined speech channel and a representative radio terminal designation signal specifying the representative radio terminal unit selected by said representative radio terminal selecting means to said plurality of radio terminal units when said base unit receives an incoming-signal answering signal from at least one of said plurality of radio terminal units;

channel switching means, included in each of said radio terminal units, for switching a radio channel of each radio terminal unit to said predetermined speech channel on the basis of said channel designation signal;

a plurality of discriminating means, each included in a corresponding one of said radio terminal units, for judging on the basis of said representative radio terminal designation signal whether or not the radio terminal unit corresponding thereto is the representative radio terminal unit;

channel-switching-completion-signal transmitting means, included in each of said radio terminal units, for transmitting a channel switching completion signal to said base unit when said discriminating means judges that the radio terminal unit corresponding thereto is the representative radio terminal unit and when channel switching is completed;

ringing-signal transmitting means, included in said base unit, for transmitting a ringing signal to said plurality of radio terminal units in response to a reception of said channel switching completion signal; and means, included in each of said radio terminal units, for generating a ringing tone in response to a reception of said ringing signal.

2. A radio communication system, comprising:

a base unit connected to a wired line;

a plurality of radio terminal units to be coupled through a radio circuit with said base unit;

incoming-signal transmitting means, included in said base unit, for transmitting an incoming signal to said plurality of radio terminal units when said base unit receives an incoming call from said wired line;

incoming-signal answering signal transmitting means, included in each of said radio terminal units, for transmitting incoming-signal answering signals containing an ID code of a corresponding radio terminal unit to said base unit at timings prescribed by said ID code in response to a reception of said incoming signal;

representative radio terminal selecting means, included in said base unit, for selecting a representative radio terminal unit from said plurality of radio terminal units;

channel-designation-signal transmitting means, included in said base unit, for transmitting a channel designation signal specifying a predetermined speech channel and a representative radio terminal designation signal specifying the representative radio terminal unit selected by said representative radio terminal selecting means to said plurality of radio terminal units when said base unit receives an incoming-signal answering signal from at least one of said plurality of radio terminal units;

channel switching means, included in each of said radio terminal units, for switching a radio channel of each radio terminal unit to said predetermined speech channel on the basis of said channel designation signal;

a plurality of discriminating means, each included in a corresponding one of said radio terminal units, for judging on the basis of said representative radio terminal designation signal whether or not the radio terminal unit corresponding thereto is the representative radio terminal unit;

channel-switching-completion-signal transmitting means, included in each of said radio terminal units, for transmitting a channel switching completion signal to said base unit when said discriminating means judges that the radio terminal unit corresponding thereto is the representative radio terminal unit and when channel switching is completed;

ringing-signal transmitting means, included in said base unit, for transmitting a ringing signal to said plurality of radio terminal units in response to a reception of said channel switching completion signal; and means, included in each of said radio terminal units, for generating a ringing tone in response to a reception of said ringing signal.

3. A radio communication system, comprising:

a base unit connected to a wired line;

a plurality of radio terminal units to be coupled through a radio circuit with said base unit;

incoming-signal transmitting means, included in said base unit, for transmitting an incoming signal to said plurality of radio terminal units when said base unit receives an incoming call from said wired line;

incoming-signal answering signal transmitting means, included in each of said radio terminal units, for transmitting an incoming-signal answering signal containing an ID code of a corresponding radio terminal unit to said base unit in response to a reception of said incoming signal;

representative radio terminal selecting means, included in said base unit, for selecting a representative radio terminal unit from said plurality of radio terminal units;

channel-designation-signal transmitting means, included in said base unit, for transmitting a channel designation signal specifying a predetermined speech channel and a representative radio terminal designation signal specifying the representative radio terminal unit selected by said representative radio terminal selecting means to said plurality of radio terminal units when said base unit receives said incoming-signal answering signals from all the radio terminal units within a predetermined time or when said base unit receives an incoming-signal answering signal from at least one of the radio terminal units and said predetermined time elapses;

channel switching means, included in each of said radio terminal units, for switching a radio channel of each radio terminal unit to said predetermined speech channel on the basis of said channel designation signal;

a plurality of discriminating means, each included in a corresponding one of said radio terminal units, for judging on the basis of said representative radio terminal designation signal whether or not the radio terminal unit corresponding thereto is the representative radio terminal unit;

channel-switching-completion-signal transmitting means, included in each of said radio terminal units, for transmitting a channel switching completion signal to said base unit when said discriminating means judges that the radio terminal unit corresponding thereto is the representative radio terminal unit and when channel switching is completed;

ringing-signal transmitting means, included in said base unit, for transmitting a ringing signal to said plurality of radio terminal units in response to a reception of said channel switching completion signal; and means, included in each of said radio terminal units, for generating a ringing tone in response to a reception of said ringing signal.

4. A radio communication system, comprising:

a base unit connected to a wired line;

a plurality of radio terminal units to be coupled through a radio circuit with said base unit;

incoming-signal transmitting means, included in said base unit, for transmitting an incoming signal to said plurality of radio terminal units when said base unit receives an incoming call from said wired line;

incoming-signal answering signal transmitting means, included in each of said radio terminal units, for transmitting an incoming-signal answering signal containing an ID code of a corresponding radio terminal unit to said base unit in response to a reception of said incoming signal;

representative radio terminal selecting means, included in said base unit, for selecting a representative radio terminal unit from one of said plurality of radio terminal units from which said incoming-signal answering signal was transmitted and received first by said base unit;

channel-designation-signal transmitting means, included in said base unit, for transmitting a channel designation signal specifying a predetermined speech channel and a representative radio terminal designation signal specifying the representative radio terminal unit selected by said representative radio terminal selecting means to said plurality of radio terminal units when said base unit receives an incoming-signal answering signal from at least one of said plurality of radio terminal units;

channel switching means, included in each of said radio terminal units, for switching a radio channel of each radio terminal unit to said predetermined speech channel on the basis of said channel designation signal;

a plurality of discriminating means, each included in a corresponding one of said radio terminal units, for judging on the basis of said representative radio terminal designation signal whether or not the radio terminal unit corresponding thereto is the representative radio terminal unit;

channel-switching-completion-signal transmitting means, included in each of said radio terminal units, for transmitting a channel switching completion signal to said base unit when said discriminating means judges that the radio terminal unit corresponding thereto is the representative radio terminal unit and when channel switching is completed;

ringing-signal transmitting means, included in said base unit, for transmitting a ringing signal to said plurality of radio terminal units in response to a reception of said channel switching completion signal; and means, included in each of said radio terminal units, for generating a ringing tone in response to a reception of said ringing signal.

5. A radio communication system, comprising:

a base unit connected to a wired line;

a plurality of radio terminal units to be coupled through a radio circuit with said base unit;

incoming-signal transmitting means, included in said base unit, for transmitting an incoming signal to said plurality of radio terminal units when said base unit receives an incoming call from said wired line;

incoming-signal answering signal transmitting means, included in each of said radio terminal units, for transmitting an incoming-signal answering signal containing an ID code of a corresponding radio terminal unit to said base unit in response to a reception of said incoming signal;

representative radio terminal selecting means, included in said base unit, for selecting a representative radio terminal unit from one of said plurality of radio terminal units which has transmitted the incoming-signal answering signal having an electric field of the greatest intensity;

channel-designation-signal transmitting means, included in said base unit, for transmitting a channel designation signal specifying a predetermined speech channel and a representative radio terminal designation signal specifying the representative radio terminal unit selected by said representative radio terminal selecting means to said plurality of radio terminal units when said base unit receives an incoming-signal answering signal from at least one of said plurality of radio terminal units;

channel switching means, included in each of said radio terminal units, for switching a radio channel of each radio terminal unit to said predetermined speech channel on the basis of said channel designation signal;

a plurality of discriminating means, each included in a corresponding one of said radio terminal units, for judging on the basis of said representative radio terminal designation signal whether or not the radio terminal unit corresponding thereto is the representative radio terminal unit;

channel-switching-completion-signal transmitting means, included in each of said radio terminal units, for transmitting a channel switching completion signal to said base unit when said discriminating means judges that the radio terminal unit corresponding thereto is the representative radio terminal unit and when channel switching is completed;

ringing-signal transmitting means, included in said base unit, for transmitting a ringing signal to said plurality of radio terminal units in response to a reception of said channel switching completion signal; and means, included in each of said radio terminal units, for generating a ringing tone in response to a reception of said ringing signal.

6. A method of controlling a radio communication system including a base unit connected to a wired line and a plurality of radio terminal units to be coupled through a radio circuit with said base unit, the method comprising the steps of:

transmitting from said base unit to said plurality of radio terminal units a channel designation signal specifying a predetermined speech channel as well as a representative terminal designation signal specifying a representative radio terminal unit from the plurality of radio terminal units when said base unit receives an incoming call from said wired line;

switching all of said plurality of radio terminal units to said predetermined speech channel and transmitting a channel switching completion signal from only the representative radio terminal unit specified by said representative radio terminal designation signal to said base unit in response to said channel designation signal;

transmitting a ringing signal from the base unit to the plurality of radio terminal units at the same time in response to a reception of said channel switching completion signal; and causing said radio terminal units to generate ringing tones in response to a reception of said ringing signal.

7. A method of controlling a radio communication system including a base unit connected to a wired line and a plurality of radio terminal units to be coupled through a radio circuit with said base unit, the method comprising the steps of:

transmitting an incoming signal from said base unit to said plurality of radio terminal units when said base unit receives an incoming call from said wired line;

transmitting incoming-signal answering signals from said plurality of radio terminal units to said base unit in response to said incoming signal;

transmitting from said base unit to said plurality of radio terminal units a channel designation signal specifying a predetermined speech channel as well as a representative terminal designation signal specifying a representative radio terminal unit from the plurality of radio terminal units in response to said incoming-signal answering signals;

switching all of said plurality of radio terminal units to said predetermined speech channel and transmitting a channel switching completion signal from only the representative radio terminal unit specified by said representative radio terminal designation signal to said base unit in response to said channel designation signal;

transmitting a ringing signal from the base unit to the plurality of radio terminal units at the same time in response to a reception of said channel switching completion signal; and causing said radio terminal units to generate ringing tones in response to a reception of said ringing signal.

8. A method of controlling a radio communication system as set forth in claim 7, wherein the transmission of said incoming-signal answering signals is carried out in mutually shifted timing relationship between said plurality of radio terminal units.

9. A method of controlling a radio communication system as set forth in claim 7, wherein said base unit transmits said channel designation signal when receiving said incoming-signal answering signals from all the radio terminal units within a predetermined time or when receiving the incoming-signal answering signal from at least one of said plurality of radio terminal units and said predetermined time elapses.

10. A method of controlling a radio communication system as set forth in claim 7, wherein said radio terminal units return to a wait mode when failing to receive said incoming signal or when failing to receive said channel designation signal within a predetermined time after transmission of said incoming-signal answering signals.

* * * * *